US011925590B2

(12) United States Patent
Nagata et al.

(10) Patent No.: US 11,925,590 B2
(45) Date of Patent: Mar. 12, 2024

(54) ELECTRIC WHEELCHAIR

(71) Applicant: Panasonic Intellectual Property Management Co., Ltd., Osaka (JP)

(72) Inventors: Takayuki Nagata, Osaka (JP); Motoki Hirose, Osaka (JP); Takeshi Ishikawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 250 days.

(21) Appl. No.: 17/331,695

(22) Filed: May 27, 2021

(65) Prior Publication Data
US 2021/0378892 A1 Dec. 9, 2021

(30) Foreign Application Priority Data

Jun. 9, 2020 (JP) .................................. 2020-100130

(51) Int. Cl.
*A61G 5/04* (2013.01)
*A61G 5/10* (2006.01)
*F16D 13/38* (2006.01)

(52) U.S. Cl.
CPC ................ *A61G 5/048* (2016.11); *A61G 5/10* (2013.01); *F16D 13/38* (2013.01)

(58) Field of Classification Search
CPC . A61G 5/04; A61G 5/10; A61G 5/048; A61G 5/1051; A61G 2203/70; F16D 13/38
USPC ........................................................ 180/218
See application file for complete search history.

(56) References Cited

U.S. PATENT DOCUMENTS 3,100,547 A * 8/1963 Rosenthal ............ A61G 5/1054
280/11
3,903,513 A * 9/1975 Green .................. A61G 5/1018
340/457.3

FOREIGN PATENT DOCUMENTS

| JP | 9-294777 | 11/1997 |
| JP | 10-094561 | 4/1998 |
| JP | 10-118126 | 5/1998 |
| JP | 2001-070351 | 3/2001 |
| JP | 2001-346833 | 12/2001 |

(Continued)

OTHER PUBLICATIONS

Extended European Search Report dated Oct. 29, 2021 in related European Patent Application No. 21174704.3.

*Primary Examiner* — Minnah L Seoh
*Assistant Examiner* — Felicia L. Brittman
(74) *Attorney, Agent, or Firm* — WENDEROTH, LIND & PONACK, L.L.P.

(57) ABSTRACT

An electric wheelchair includes a main frame; a drivable wheel supported by the main frame; an electric motor disposed on the main frame and configured to drive the drivable wheel; a clutch configured to switch a power transmission path from the electric motor to the drivable wheel between an engagement state and a disengagement state; and a clutch operation handle configured to be moved in a predetermined range in an up-down direction. The clutch operation handle is configured to operate the clutch so as to be in: (i) one of the engagement state or the disengagement state when the clutch operation handle is stopped at a lowest position of the predetermined range; and (ii) the other of the engagement state or the disengagement state when the clutch operation handle is stopped at a highest position of the predetermined range.

11 Claims, 8 Drawing Sheets

(56) References Cited

FOREIGN PATENT DOCUMENTS

| JP | 2003-164492 | 6/2003 |
| JP | 2005-066245 | 3/2005 |
| JP | 2006-131214 | 5/2006 |
| JP | 2012-125296 | 7/2012 |
| JP | 2013-107571 | 6/2013 |
| JP | 2018-111439 | 7/2018 |

* cited by examiner

Lower edge height of olecranon

ELECTRIC WHEELCHAIR

BACKGROUND

1. Technical Field

The present disclosure relates to an electric wheelchair.

2. Description of the Related Art

A wheelchair is often used for transit at an airport, especially mainly for the elderly. Normally, one staff member pushes one wheelchair by hand to guide the wheelchair, but it requires a large number of persons. Therefore, for example, as disclosed in Japanese Patent Unexamined Publication No. 2013-107571, it is proposed that following control, which is control for making a vehicle automatically follow a preceding vehicle, is applied to an electric wheelchair to save labor. When an electric wheelchair having the following control as in Japanese Patent Unexamined Publication No. 2013-107571 is used, for example, the electric wheelchair is traveled (hereinafter referred to as "following travel") to follow a wheelchair that the staff pushes or operates by hand to guide the wheelchair. By making the electric wheelchair follow another electric wheelchair, it is possible for one person to guide a plurality of wheelchairs traveling in a platoon (hereinafter referred to as "platooning travel").

However, even in a case where such an electric wheelchair is used, when being guided to an elevator or passing through a narrow passage, it is necessary for the staff to manually push the wheelchair and the electric wheelchair one by one (hereinafter referred to as "hand-pushing movement"). At this time, it is often necessary to switch from the following travel to the hand-pushing movement, or from the hand-pushing movement to the following travel. Switching between travel by driving of an electric motor such as the following travel and the hand-pushing movement is performed by operating a clutch provided on the electric motor to engage or disengage the electric motor and a driving wheel.

For example, FIGS. 5 and 6 of Japanese Patent Unexamined Publication No. 9-294777 disclose a configuration in which a clutch lever for operating a clutch is disposed in the vicinity of the electric motor. However, in such a configuration, when the staff operates the clutch lever, it is necessary to change a posture significantly, which is not suitable for frequently operating the clutch. Therefore, Japanese Patent Unexamined Publication No. 9-294777 discloses a clutch operation device in which a clutch lever is attached to a hand-pushing handle as a proposal for facilitating the clutch operation of a caregiver.

SUMMARY

According to an aspect of the present disclosure, there is provided an electric wheelchair including: a main frame; a driving wheel supported by the main frame; an electric motor disposed on the main frame to drive the driving wheel; a clutch that switches a power transmission path from the electric motor to the driving wheel between an engagement state and a disengagement state; and a clutch operation handle configured to be moved in a predetermined range in an up-down direction. The clutch operation handle is configured to operate the clutch so as to be in one of the engagement state and the disengagement state when the clutch operation handle is stopped at a lowest position of the predetermined range, and operate the clutch so as to be in the other state when the clutch operation handle is stopped at a highest position of the predetermined range.

DETAILED DESCRIPTION

Figure 1:
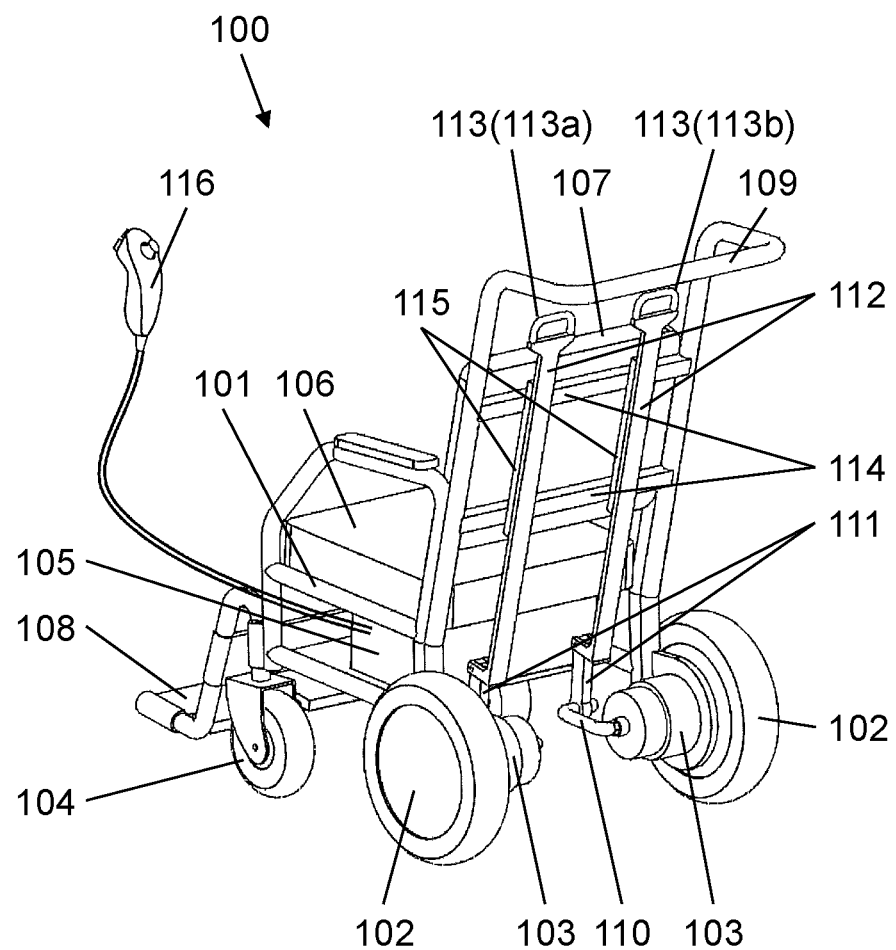
FIG. 1 is a perspective view of an electric wheelchair according to an exemplary embodiment of the present disclosure as viewed from a back surface.

The clutch operation device disclosed in Japanese Patent Unexamined Publication No. 9-294777 has a configuration in which the clutch lever is pulled and gripped against a force of a return spring for engaging the clutch, and the hand-pushing movement can be performed only while the clutch lever is gripped. Therefore, when the clutch is frequently operated, the arm gets tired.

An object of the present disclosure is to provide an electric wheelchair in which convenience can be improved.

EXEMPLARY EMBODIMENTS

Hereinafter, exemplary embodiments of the present disclosure will be described with reference to the drawings. The same configuration elements are designated by the same reference numerals. The drawings are schematically illustrated mainly for each configuration element for easy understanding.

<Configuration of Electric Wheelchair>

FIG. 1 is a perspective view of an electric wheelchair according to an exemplary embodiment of the present disclosure as viewed from a rear. As illustrated in FIG. 1, electric wheelchair 100 of the present exemplary embodiment includes main frame 101, a pair of left and right driving wheels 102 disposed behind a lower portion of main frame 101, electric motors 103 that independently drive left and right driving wheels 102, a pair of left and right auxiliary wheels 104 provided in front of driving wheels 102, electric driving unit 105, seat 106 on which a user of electric wheelchair 100 is seated, backrest 107 that is provided behind seat 106 and supports the back of the user, footrest 108 which is provided at a front portion of main frame 101 and on which the user puts his/her feet, and hand-pushing handle 109 for a caregiver that is attached to an upper portion of main frame 101.

Electric motor 103 includes a built-in electromagnetic brake (not illustrated) and clutch lever 110 for operating a clutch, and is configured such that the clutch can be operated by rotating clutch lever 110. Clutch lever 110 is connected to slide arm 112 via connecting rod 111, and clutch operation handle 113 is provided at an upper end of slide arm 112. A pair of left and right clutch levers 110, connecting rods 111, slide arms 112, and clutch operation handles 113 are provided.

Slide arm 112 is attached to slider 115 installed on back frames 114 that support backrest 107. With this configuration, slide arm 112 can be moved up and down along slider 115. As slide arm 112 moves up and down, clutch operation handle 113 moves in a predetermined range in an up-down direction. Connecting rod 111 and clutch lever 110, and connecting rod 111 and slide arm 112 are respectively connected by hinges, and are configured such that a force from linearly operating slide arm 112 is transmitted to rotating clutch lever 110.

Figure 2:
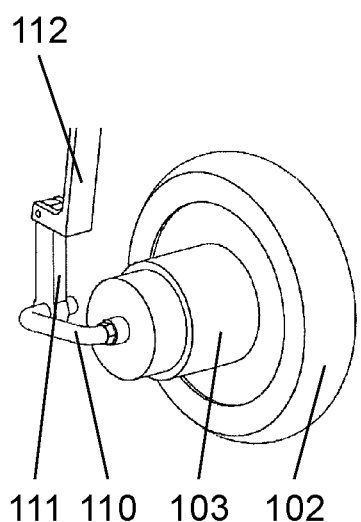
FIG. 2 is an enlarged view illustrating a state of a clutch lever when a clutch is disengaged.
Figure 3:
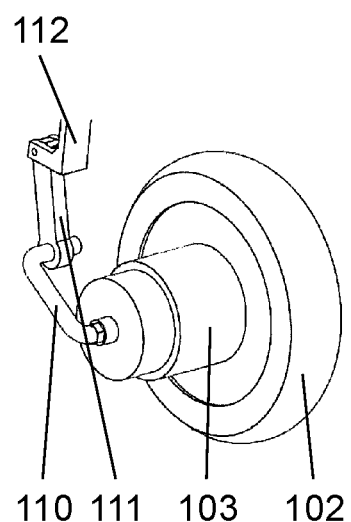
FIG. 3 is an enlarged view illustrating a state of the clutch lever when the clutch is engaged.

FIGS. 2 and 3 are enlarged views illustrating an operation of clutch lever 110, in which FIG. 2 is an enlarged view illustrating a state of the clutch lever when the clutch is disengaged, and FIG. 3 is an enlarged view illustrating the state of the clutch lever when the clutch is engaged. When slide arm 112 is pushed down, as illustrated in FIG. 2, clutch lever 110 rotates counterclockwise to disengage clutch 120 which will be described later. When slide arm 112 is pulled up, as illustrated in FIG. 3, clutch lever 110 rotates clockwise to engage clutch 120.

Figure 4:
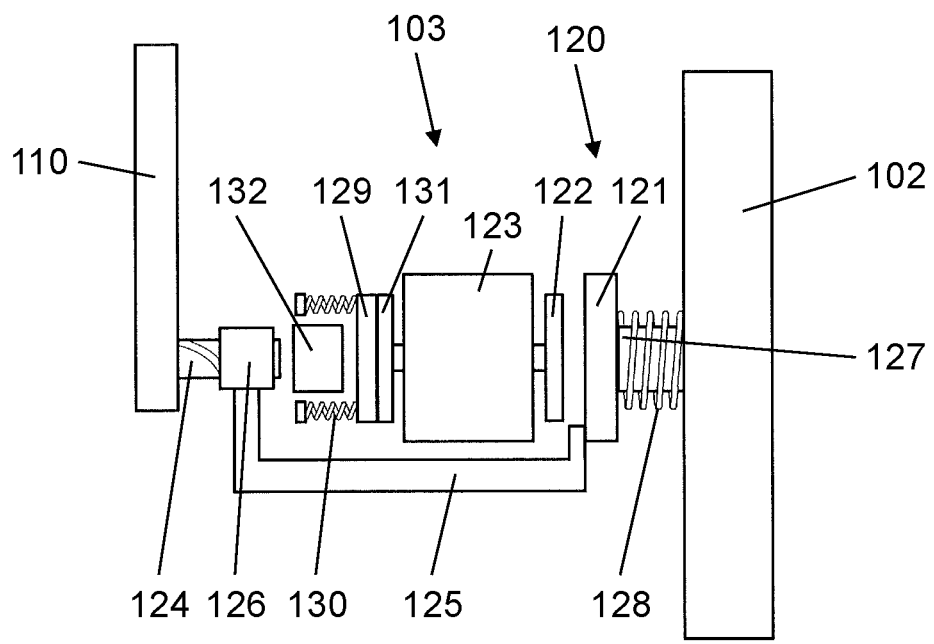
FIG. 4 is an explanatory view of the clutch and an electromagnetic brake of an electric motor.

FIG. 4 is an explanatory view of the clutch and the electromagnetic brake of electric motor 103. FIG. 4 illustrates a state where clutch 120 is disengaged and a state where the electromagnetic brake is applied. Clutch 120 includes slide plate 121 and clutch plate 122. The state where clutch 120 is disengaged is a state where there is a gap between clutch plate 122 and slide plate 121, and a driving force from motor body 123 is not transmitted to driving wheel 102. The state where the electromagnetic brake is applied is a state where movable iron core 129 and brake lining 131 are crimped by spring 130, and driving of motor body 123 is inhibited.

In FIG. 4, clutch cam 124 is configured to be rotated by clutch lever 110. Sliding cylinder 126 is configured to slide in a driving shaft direction (left-right direction in FIG. 4) of driving wheel 102 by the rotation of clutch cam 124. Shift arm 125 is welded to an outside of sliding cylinder 126 and is configured to be driven following the slide of sliding cylinder 126. Slide plate 121 is slidably mounted on shaft 127 that transmits the driving force to driving wheel 102, and is configured to transmit a rotational torque to shaft 127. Slide plate 121 is configured to be pushed toward clutch plate 122 by coil spring 128. Clutch plate 122 is attached to an output shaft of motor body 123.

In such a configuration, when clutch lever 110 is rotated in a direction in which clutch 120 is engaged, sliding cylinder 126 and shift arm 125 are slid toward clutch lever 110 side (left side in FIG. 4) by clutch cam 124, and slide plate 121 is pushed by coil spring 128 and crimped to clutch plate 122. When slide plate 121 is crimped to clutch plate 122, the driving force from motor body 123 can be transmitted to driving wheel 102. That is, clutch 120 is in the engagement state. On the other hand, when clutch lever 110 is rotated to a side where clutch 120 is disengaged, slide plate 121 is pushed by shift arm 125 and separated from clutch plate 122, so that the driving force from motor body 123 cannot be transmitted to driving wheel 102.

Movable iron core 129 is configured to be pushed against brake lining 131 by spring 130. Electromagnetic coil 132 is configured to attract movable iron core 129 by a magnetic force when energized.

In such a configuration, when a voltage is applied to electromagnetic coil 132, movable iron core 129 pushed toward a brake lining 131 side by spring 130 is attracted to electromagnetic coil 132, and a gap is generated between movable iron core 129 and brake lining 131. As a result, the brake is released and motor body 123 is movable. On the other hand, when the application of the voltage to electromagnetic coil 132 is stopped, the attraction of movable iron core 129 by electromagnetic coil 132 is released, and movable iron core 129 pushed by spring 130 applies a pressure to brake lining 131 to inhibit the driving of motor body 123.

Auxiliary wheels 104 are rotatably provided around an axis in a vertical direction so as to be capable of moving in all directions in a horizontal plane. By driving the pair of driving wheels 102 with electric motor 103, electric wheelchair 100 can freely move. When clutch 120 is disengaged by clutch lever 110, the caregiver can push electric wheelchair 100 to move in the same manner as an ordinary wheelchair. Electric driving unit 105 includes a battery for driving electric motor 103, a motor controller for controlling the driving of electric motor 103, and a communicator that performs inter-vehicle communication for following travel. Wired remote controller 116 for the caregiver to operate electric wheelchair 100 is connected to the motor controller.

Although not illustrated, an object detection sensor for following travel and obstacle detection may be provided at the front portion of main frame 101. This object detection sensor irradiates a periphery of electric wheelchair 100 with a laser, and measures a distance to an object existing in the periphery as object distance information. An example of the object of the periphery includes an obstacle such as a preceding vehicle for the following travel, a peripheral wall on which electric wheelchair 100 travels, or a pedestrian.

As will be described in detail later, in the application assumed in the present disclosure, clutch 120 is frequently operated by the caregiver, and clutches 120 of a plurality of electric wheelchairs 100 are also operated, so that clutch 120 is required to be easily operated. As a result of trial and error experiments by the discloser, it was found that a positional relationship between clutch operation handle 113 and hand-pushing handle 109 has a desirable range.

Figure 5:
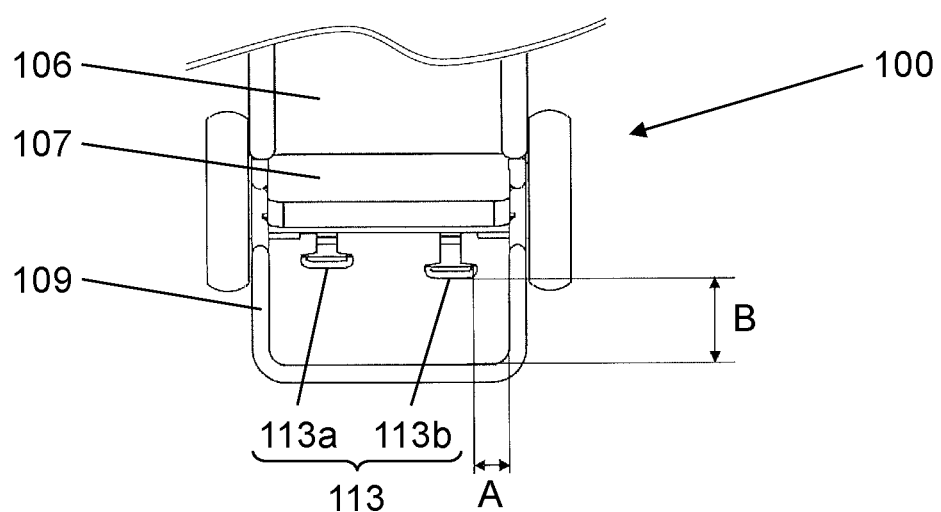
FIG. 5 is a top view of a periphery of a clutch operation handle.
Figure 6:
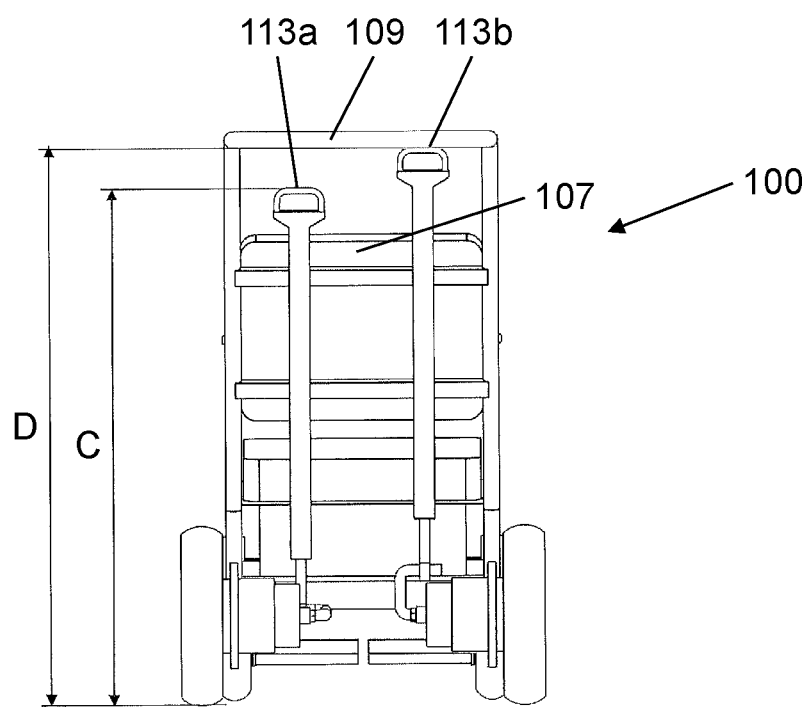
FIG. 6 is a rear view of the periphery of the clutch operation handle.

FIGS. 5 and 6 are explanatory views illustrating a desirable position of clutch operation handle 113, in which FIG. 5 illustrates a top view of a periphery of clutch operation handle 113, and FIG. 6 illustrates a rear view of the periphery of clutch operation handle 113.

FIGS. 5 and 6 illustrate a state when left clutch operation handle 113a disengages clutch 120, and a state when right clutch operation handle 113b engages clutch 120. A distance between left clutch operation handle 113a or right clutch operation handle 113b and hand-pushing handle 109 in a left-right direction is indicated by A, and a distance between left clutch operation handle 113a or right clutch operation handle 113b and hand-pushing handle 109 in a front-rear direction is indicated by B. A height of clutch operation handle 113 from a lower end of driving wheel 102 in a state where clutch 120 is disengaged is indicated by C, and a height of clutch operation handle 113 from the lower end of driving wheel 102 in a state where clutch 120 is engaged is indicated by D. That is, the height (hereinafter, may be referred to as "lowest height") from the lower end of driving wheel 102 to a lowest position in a movement range of clutch operation handle 113 is indicated by C, and the height (hereinafter, may be referred to as "highest height") from the lower end of driving wheel 102 to a highest position in the movement range is indicated by D.

The height of clutch operation handle 113 from the lower end of driving wheel 102 illustrated in FIG. 6 satisfies a relationship of "0.7 m≤C<D≤1.3 m". First, the reason why C<D is that when clutch 120 is disengaged, as illustrated in FIG. 4, since clutch operation handle 113 is operated against an urging force of coil spring 128, it requires more force than when clutch 120 is engaged, and as a result of trial and error experiments, it was concluded that it is easier to apply force by pushing down clutch operation handle 113. Therefore, the state where clutch operation handle 113 is lowered is defined as the disengagement of clutch 120, and the state where clutch operation handle 113 is lifted is defined as the engagement of clutch 120.

Figure 7:
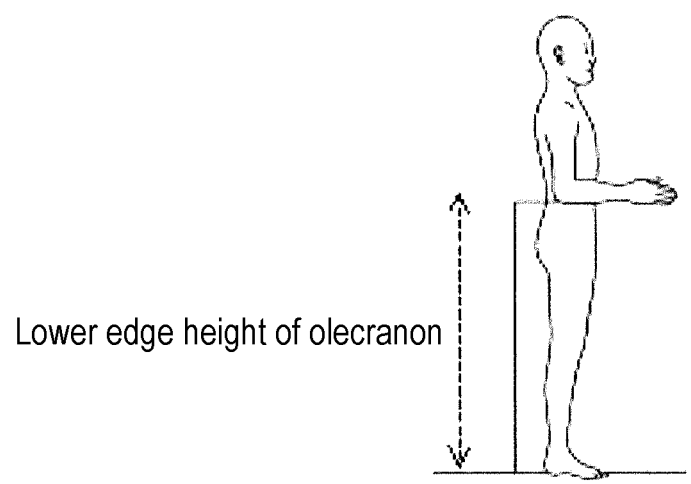
FIG. 7 is an explanatory view of a lower edge height of the olecranon.

The reason why lowest height C of clutch operation handle 113 is 0.7 m or more and highest height D is 1.3 m or less is a result of experimentally finding the range where the caregiver can reach out smoothly without changing a posture of the caregiver such as bending down before and after the hand-pushing movement. According to one experimental survey, the height of the hand-pushing handle that is easy to push when pushing a carriage is said to be about 90% of a height of a lower edge of the olecranon illustrated in FIG. 7, and although there are individual differences, it is generally 0.7 m or more and 1.3 m or less. When this result is combined with the results of our study, it is convenient to set lowest height C of clutch operation handle 113 to 0.7 m or more and highest height D to 1.3 m or less so as to be the same as the height of hand-pushing handle 109.

In a case where the above conditions are satisfied, clutch operation handle 113 and hand-pushing handle 109 come close to each other, which may inhibit the operation of clutch 120. Therefore, it is desirable that distances A and B illustrated in FIG. 5 be 0.05 m or more, respectively. If distance A is too long, left and right clutch operation handles 113 will overlap, so that distance A is desirably 0.2 m or less. If distance B is too long, it is not possible to reach and operate hand-pushing handle 109 smoothly before and after holding hand-pushing handle 109, so that distance B is desirably 0.3 m or less.

A movable width of clutch operation handle 113, that is, a difference between lowest height C and highest height D is desirably 0.1 m or more in order to clearly visualize the difference between the disengagement state and the engagement state of clutch 120. In this way, the caregiver can clearly visualize the state of clutch 120 even if he/she is away from electric wheelchair 100, and forgets to engage clutch 120 (situation in which he/she forgets the engagement operation of clutch 120), the situation can be noticed immediately. Therefore, it is possible to reduce the time and effort required for the caregiver to perform the platooning travel. If the movable width of clutch operation handle 113 is too long, since the operability deteriorates, the movable width is preferably 0.6 m or less.

When lowest height C or highest height D is set to the same height as the height from the lower end of driving wheel 102 to the upper end of backrest 107 or the height to hand-pushing handle 109, that is, when a mark is formed of the upper end of backrest 107 or hand-pushing handle 109, the height of clutch operation handle 113 can be recognized by using backrest 107 and hand-pushing handle 109 as a reference for comparison. In this case, even if the movable width of clutch operation handle 113 is small, it becomes easy to grasp the height position of clutch operation handle 113.

A mark may be provided at the position of lowest height C or highest height D on a back surface side of electric wheelchair 100. A back cover that covers slide arm 112 may be provided, and the mark attached to slide arm 112 may be compared with the position of the upper end of the back cover. Alternatively, slide arm 112 may be provided with a slide-type display plate (formed of two types of displays having different colors and characters and a shielding plate that shields one of the displays, and the display is switched by sliding the display or the shielding plate). In these cases as well, the height position of clutch operation handle 113 can be easily grasped by using the mark as a reference for comparison. In a case where the mark is provided, the difference between lowest height C and highest height D may be 0.1 m or less.

<Operation of Electric Wheelchair>

An operation of electric wheelchair 100 of the present exemplary embodiment configured as described above will be described. Electric wheelchair 100 of the present disclosure is assumed to be used for guiding a plurality of electric wheelchairs 100 by one caregiver, for example, at an airport or the like, and one purpose thereof is to easily perform switching between automatic driving such as following travel and hand-pushing movement by the caregiver. Therefore, as the operation, the switching between the automatic driving and the hand-pushing movement will be mainly described. Since a following travel method is not related to the present disclosure, the proposed method of the related art will be used and detailed description thereof will be omitted.

Figure 8:
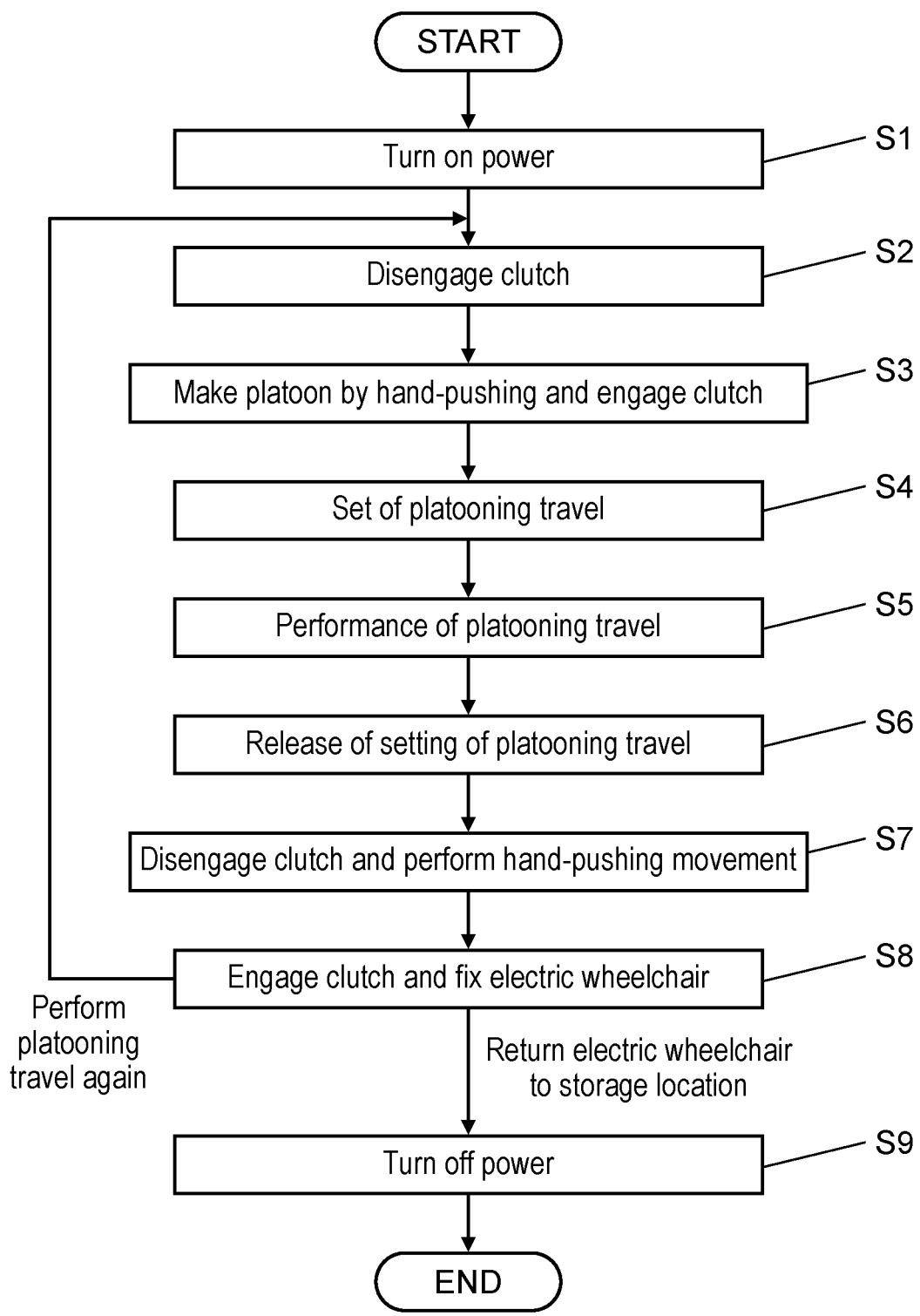
FIG. 8 is a flowchart illustrating an example of an operation of an electric wheelchair.

FIG. 8 is a flowchart illustrating an example of the operation of electric wheelchair 100 according to the present exemplary embodiment. The flowchart illustrates an operation example in which the caregiver such as an airport staff prepares a plurality of electric wheelchairs 100 in a storage location, lets the users get on electric wheelchairs 100, guides them in the platooning travel, switches to the hand-pushing movement in the middle thereof, and then restarts the guide by the platooning travel, and finally returns electric wheelchairs 100 to the storage location.

As illustrated in FIG. 8, first, power of the plurality of electric wheelchairs 100 is turned on by the caregiver (step S1). Therefore, electric power of the battery in electric driving unit 105 is supplied to the motor controller or the like.

Next, in a state where motor body 123 of each electric wheelchair 100 is not driven and the electromagnetic brake is applied, left and right clutch operation handles 113 are lowered to the lowest position to be stopped, so that clutches 120 in left and right electric motors 103 are disengaged (step S2). Therefore, electric motor 103 and driving wheel 102 are disengaged, and the hand-pushing movement by the caregiver can be performed. As the configuration in which left and right clutch operation handles 113 are stopped at the lowest position, a spring-type lock mechanism (mechanism in which a protrusion pushed out by a spring fits into a groove) can be used as an example. In this case, the protrusion can be provided on one (for example, slider 115) of slider 115 and slide arm 112, and the groove can be provided on the other (for example, slide arm 112). Although the protrusion does not come off from the groove by the force of coil spring 128, it is preferable to adjust the lock mechanism such that the protrusion comes off from the groove when an external force is further applied.

Next, the caregiver performs the hand-pushing movement of electric wheelchairs 100 one by one from the storage location and arranges them in a row in the front-rear direction, and lifts clutch operation handle 113 to the highest position in order from leading electric wheelchair 100 of the platoon to engage clutch 120 (step S3). At this time, since the electromagnetic brake is still applied, electric wheelchair 100 does not move. By operating clutches 120 in order from the front in this way, the position of clutch operation handle 113 disposed on the back surface of electric wheelchair 100, that is, the state of clutch 120 can be confirmed even during preparation of electric wheelchairs 100 behind.

Next, electric wheelchairs 100 other than the leading vehicle are set to perform the following travel (step S4). For example, for each electric wheelchair 100, it is a work to register which vehicle to follow. Before or after this setting, the user gets on each electric wheelchair 100 including the leading vehicle.

Next, the caregiver stands next to leading electric wheelchair 100 of the platoon, causes leading electric wheelchair 100 to travel by operating remote controller 116 (releases the electromagnetic brake and drives motor body 123), and causes other electric wheelchairs 100 to perform the following travel. Therefore, a plurality of electric wheelchairs 100 in a platoon are guided (step S5). At this time, electric wheelchairs 100 other than the leading vehicle travel while performing inter-vehicle communication of information necessary for the following travel from the communicator in electric driving unit 105. Alternatively, the following travel is performed by using information from the object detection sensor (not illustrated).

Next, for example, an operation in a state where an elevator is in the middle of the guidance will be described. In this case, in order to quickly move electric wheelchair 100 into the elevator, the caregiver needs to switch from the platooning travel to the hand-pushing movement for guidance. For that purpose, first, the driving of motor body 123 of leading electric wheelchair 100 guided by the caregiver is stopped, and the electromagnetic brake is applied to stop leading electric wheelchair 100. Therefore, following electric wheelchairs 100 also stop in sequence. The caregiver releases the setting of the following travel performed in step S4 (step S6). Therefore, even if preceding electric wheelchair 100 is moved, rear electric wheelchair 100 does not follow and move.

Next, the caregiver lowers left and right clutch operation handles 113 to disengage clutch 120, and moves the wheelchair into the elevator by the hand-pushing movement (step S7). When all of electric wheelchairs 100 enter the elevator, the caregiver stops the wheelchairs, lifts left and right clutch operation handles 113, and engages clutch 120. At this time, since the electromagnetic brake is applied, the brake is in the applied state by the engagement of clutch 120, and electric wheelchair 100 is fixed in the elevator (step S8).

Next, in a case where the platooning travel is performed again after using the elevator, the caregiver returns to step S2 to disengage clutch 120, and then arranges the wheelchairs in a row, and engages clutch 120 (step S3). After that, by performing steps S4 and S5, it is possible to guide by the platooning travel again.

Finally, in a case where the use of electric wheelchair 100 is finished and electric wheelchair 100 is returned to the storage location, the user gets out of the vehicle at the time of step S6 and the hand-pushing movement is performed to the storage location in step S7. After the wheelchair stops in the storage location, clutch 120 is engaged and the brake is applied (step S8), the power is turned off, and the process is finished (step S9). In the flowchart of FIG. 8, the user gets on the vehicle in step S4 and the user gets out of the vehicle in step S6, but the user can freely get on and out of the vehicle before and after step S4, during the temporary stop in step S5, and before and after step S6.

<Operational Effects of Exemplary Embodiments>

According to the electric wheelchair of the present disclosure, convenience can be improved. Specifically, as described above, in electric wheelchair 100 of the present exemplary embodiment, clutch operation handle 113 is configured to be movable in a predetermined range in the up-down direction. Clutch 120 is configured to be disengaged when clutch operation handle 113 is stopped at the lowest position, and clutch 120 is configured to be engaged when clutch operation handle 113 is stopped at the highest position. Therefore, even if clutch operation handle 113 is not gripped, clutch 120 is maintained in the disengagement state, so that even if clutch 120 is frequently operated, it is possible to suppress that the arm of the caregiver is tired. Therefore, it is possible to provide electric wheelchair 100 in which convenience can be improved. Clutch 120 can be operated by moving the arm up and down, and the change in posture can be reduced as compared with a configuration in which the clutch lever near the electric motor is moved back and forth when the clutch is operated. Therefore, fatigue of the caregiver can be further reduced.

Lowest height C of the movement range of clutch operation handle 113 is 0.7 m or more, and highest height D is 1.3 m or less. Therefore, the caregiver can smoothly operate clutch operation handle 113 in the same posture before and after the hand-pushing movement, that is, before and after gripping hand-pushing handle 109. The hand-pushing movement from the operation of the clutch 120, or the operation of the clutch 120 from the hand-pushing movement can be easily performed.

Modified Examples

Needless to say, the present disclosure is not limited to those illustrated in the exemplary embodiments described above, and various modified examples can be added without departing from the spirit of the present disclosure.

Figure 9:
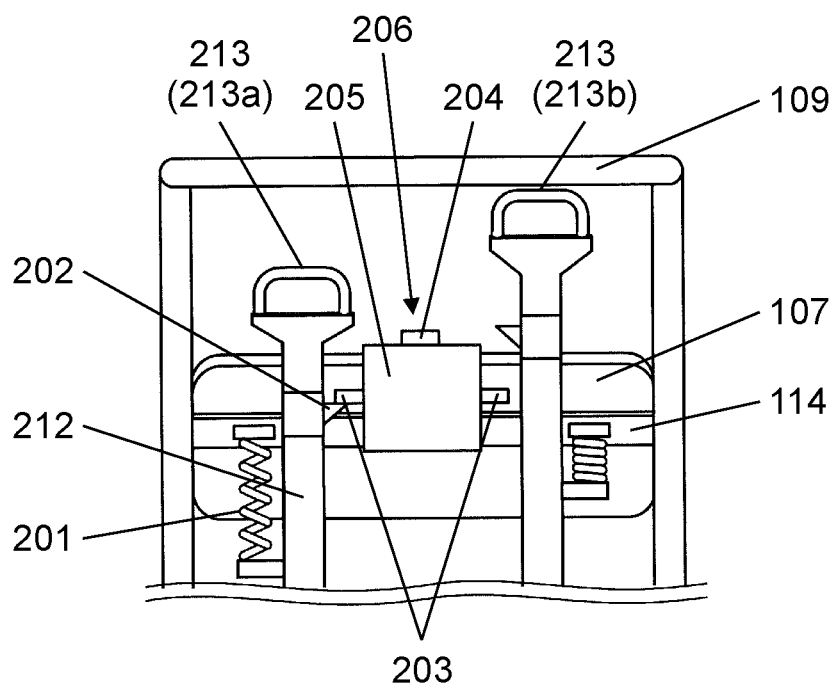
FIG. 9 is a rear view illustrating a slide arm and a clutch operation handle of an electric wheelchair in a modified example of the present disclosure.

In the example of FIG. 1, in left and right electric motors 103, both the engagement and disengagement operations of clutch 120 are configured to be independently performed, but this is an example, and the disengagement of clutch 120 may be performed by two or more operations and the engagement may be performed by one operation. In this case, a configuration illustrated in FIG. 9 may be considered. FIG. 9 is a rear view illustrating a slide arm and a clutch operation handle of an electric wheelchair.

In the configuration of FIG. 9, slide arm 212 is configured to be pulled up by return spring 201, and when clutch operation handle 213 is pushed down to the lowest position (position of left clutch operation handle 213*a*) of the movement range, latch 202 is configured to hook on stopper 203. Here, latch 202 is configured to be slidably attached to slide arm 212 in the left-right direction, and is configured to protrude to a state illustrated in the drawing under no load state by an attached spring, and is stored inside slide arm 212 when an external force is applied. Return spring 201, latch 202, and stopper 203 have the same structure on the left and right. Left and right stoppers 203 are configured to be stored inside switch box 205 while button 204 is pressed. Return spring 201, latch 202, stopper 203, button 204, and switch box 205 constitute handle position control mechanism 206.

With this configuration, when disengaging clutch 120, two operations of pushing down left and right clutch operation handles 213 respectively to the lowest position are required, so that it is possible to reduce an erroneous operation that cause a dangerous state. On the other hand, when engaging clutch 120, left and right clutch operation handles 213 can be pushed up to the highest position (position of right clutch operation handle 213b) respectively by an urging force of return spring 201 by one operation of pressing button 204, and the convenience is improved.

In order to obtain the same effect as that of the configuration illustrated in FIG. 9, the left and right clutch operation handles may be configured to be coupled so as to be operated simultaneously, and when the clutch operation handle is lowered, that is, when clutch 120 is disengaged, a configuration, in which another necessary operation is added, may be provided. As the added operation, for example, a configuration, in which a lock mechanism for disabling the clutch operation handle may be provided and a configuration, in which the operation for releasing the lock is added to the disengagement operation of clutch 120, may be provided.

Figure 10:
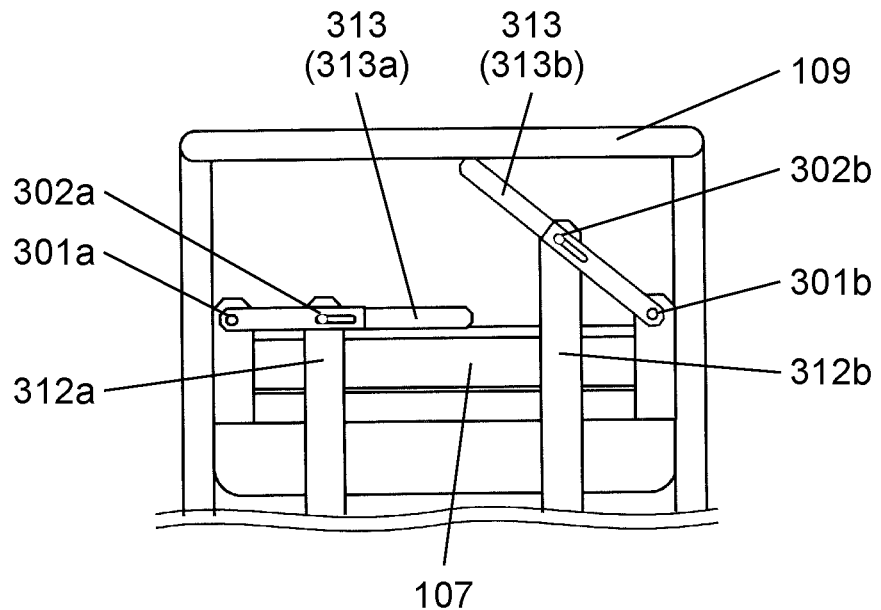
FIG. 10 is a rear view illustrating a slide arm and a clutch operation handle of an electric wheelchair according to another modified example of the present disclosure, in which a left side illustrates a disengagement state of the clutch and a right side illustrates an engagement state of the clutch.
Figure 11:
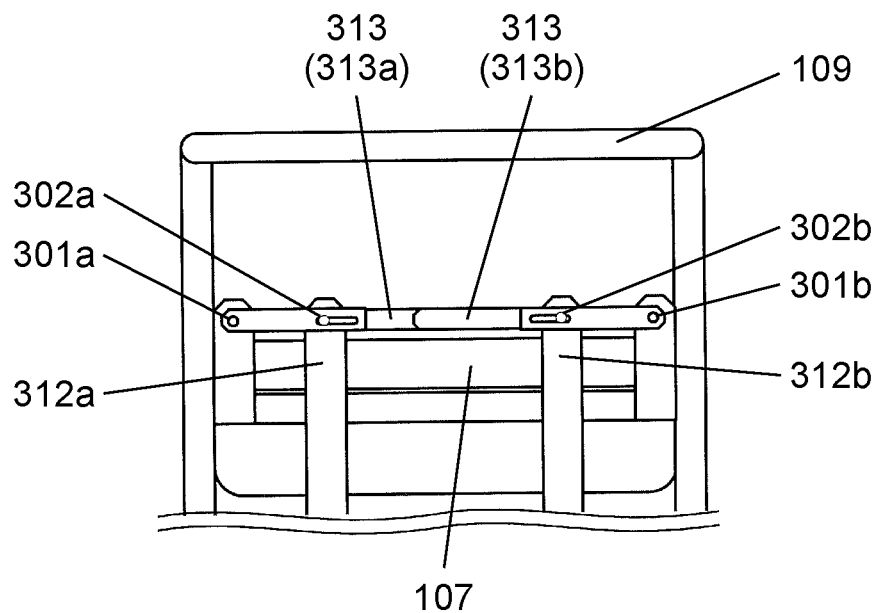
FIG. 11 is a rear view illustrating the slide arm and the clutch operation handle of the electric wheelchair in the other modified example of the present disclosure, in which both the left and right sides illustrate the disengagement state of the clutch.

Although the clutch operation handle is configured to be slid up and down in FIG. 1, the clutch operation handle may be configured to be rotated. FIGS. 10 and 11 are rear views illustrating the slide arm and the clutch operation handle of the electric wheelchair, in which FIG. 10 illustrates the disengagement state of the clutch on the left side, the engagement state of the clutch on the right side, and FIG. 11 illustrates the disengagement state of the clutch on both the left and right sides.

In FIGS. 10 and 11, left clutch operation handle 313a is configured to rotate around joint 301a as a fulcrum, and is connected to slide arm 312a by slider joint 302a. By rotating left clutch operation handle 313a, slide arm 312a is configured to be slid up and down, and clutch 120 is configured to be engaged and disengaged. Similarly, right clutch operation handle 313b is configured to rotate around joint 301b as a fulcrum, and is configured to be connected to slide arm 312b by slider joint 302b. By rotating right clutch operation handle 313b, the operation of clutch 120 is configured to be performed.

With this configuration, when clutch 120 is disengaged, rotation tips of left and right clutch operation handles 313a and 313b are respectively necessary to be pushed down to the lowest position (position of left clutch operation handle 313a of FIG. 10) of the movement range of the rotation tips. However, when clutch 120 is engaged, a portion where left clutch operation handle 313a and right clutch operation handle 313b overlap each other is pushed up to the highest position (position of right clutch operation handle 313b in FIG. 10) of the movement range of the rotation tips, so that left and right clutches 120 can be engaged simultaneously. Therefore, clutch 120 can be easily engaged with one operation while reducing an erroneous operation by performing two operations for the disengagement of clutch 120. In this configuration, an angle of clutch operation handle 313 (left clutch operation handle 313a and right clutch operation handle 313b) also changes according to the state of clutch 120, so that the visibility for confirming the state of clutch 120 is further improved. When clutch 120 is disengaged and the hand-pushing movement is performed, the state illustrated in FIG. 11 is obtained. Therefore, left clutch operation handle 313a and right clutch operation handle 313b can be used as the hand-pushing handles. Thus, switching between manual and automatic can be made even quicker.

In the exemplary embodiments and the modified examples, since clutch operation handles 113, 213, and 313 are disposed on the back surface of backrest 107, the state of clutch 120 cannot be confirmed from the front while the user gets on the vehicle. Therefore, an indicator light, which is an example of the notifier, may be disposed in front of electric wheelchair 100 to light up according to the state of clutch 120, or a speaker, which is an example of the notifier, may be disposed to notify by sound.

In the exemplary embodiments and the modified examples, clutch 120 is disengaged when the clutch operation handles 113, 213, and 313 are stopped at the lowest position, and clutch 120 is engaged when the clutch operation handles 113, 213, and 313 are stopped at the highest position. However, clutch 120 may be engaged when the clutch operation handles are stopped at the lowest position, and clutch 120 may be disengaged when the clutch operation handles are stopped at the highest position.

Figure 12:
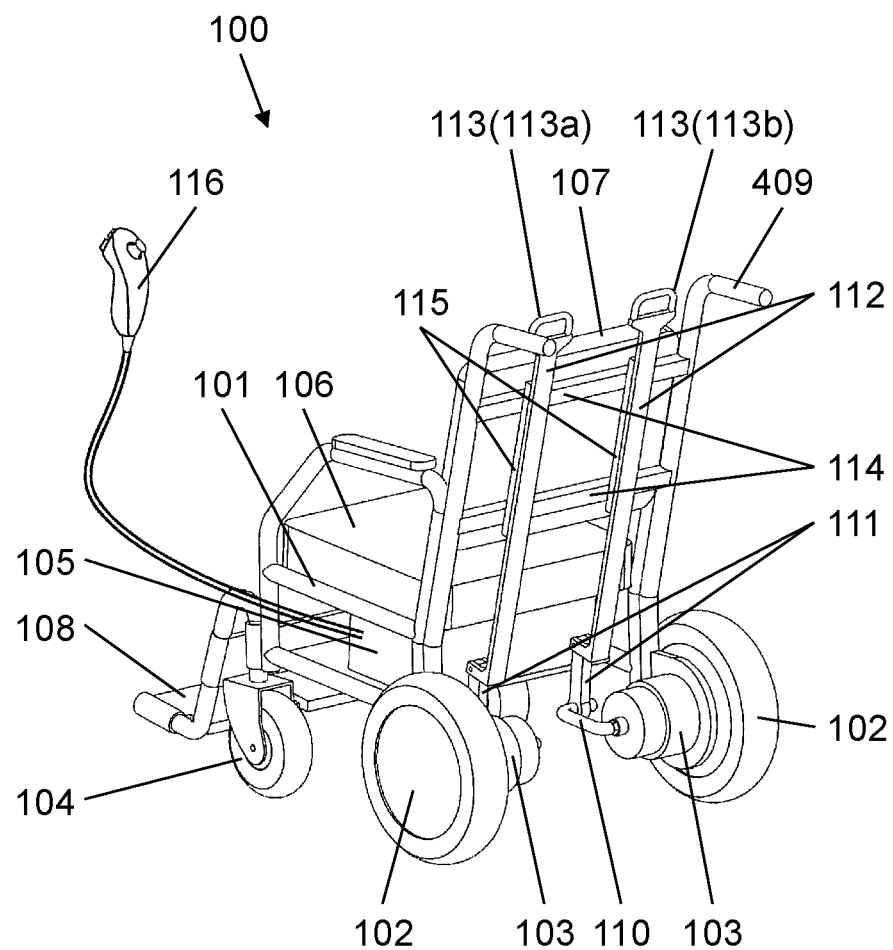
FIG. 12 is a rear view illustrating a hand-pushing handle of an electric wheelchair in further another modified example of the present disclosure.

In the exemplary embodiments, hand-pushing handle 109 is formed of one rod in the left-right direction, but as illustrated in FIG. 12, the left and right sides of hand-pushing handle 409 may be configured to be separated. The number of driving wheel 102 may be one.

By appropriately combining any embodiment or a modified example of the exemplary embodiments or the modified examples, the effects of the respective exemplary embodiments or modified examples can be achieved.

The electric wheelchair of the present disclosure is useful for guiding a large number of wheelchairs with a small number of people, such as airport transfer and guide tour.

What is claimed is:

1. An electric wheelchair comprising:
   a main frame;
   a drivable wheel supported by the main frame;
   an electric motor disposed on the main frame and configured to drive the drivable wheel;
   a clutch configured to switch a power transmission path from the electric motor to the drivable wheel between an engagement state and a disengagement state; and
   a clutch operation handle configured to be moved rectilinearly in a predetermined range in an up-down direction,
   wherein the clutch operation handle is configured to operate the clutch so as to be in: (i) one of the engagement state or the disengagement state when the clutch operation handle is stopped at a lowest position of the predetermined range; and (ii) the other of the engagement state or the disengagement state when the clutch operation handle is stopped at a highest position of the predetermined range.

2. The electric wheelchair of claim 1,
   wherein the clutch operation handle is configured to be operated such that when the clutch operation handle is stopped at the lowest position of the predetermined range, the clutch is in the disengagement state and when the clutch operation handle is stopped at the highest position of the predetermined range, the clutch is in the engagement state.

3. The electric wheelchair of claim 1,
wherein the lowest position of the predetermined range is 0.7 m or more from a lower end of the drivable wheel, and the highest position is 1.3 m or less from the lower end of the drivable wheel.

4. The electric wheelchair of claim 1,
wherein a difference between the lowest position of the predetermined range and the highest position of the predetermined range is 0.1 m or more.

5. The electric wheelchair of claim 1, further comprising:
a hand-pushable handle disposed above and behind the main frame.

6. The electric wheelchair of claim 5,
wherein a distance between the clutch operation handle and the hand-pushable handle in a left-right direction is 0.05 m or more and 0.2 m or less.

7. The electric wheelchair of claim 5,
wherein a distance between the clutch operation handle and the hand-pushable handle in a front-rear direction is 0.05 m or more and 0.3 m or less.

8. The electric wheelchair of claim 5,
wherein the hand-pushable handle or an upper end of a backrest of a chair structure disposed on the main frame is disposed at a position that serves as a mark for at least one of the lowest position of the predetermined range or the highest position of the predetermined range.

9. The electric wheelchair of claim 1,
wherein a mark is provided for at least one of the lowest position of the predetermined range or the highest position of the predetermined range.

10. The electric wheelchair of claim 1, further comprising:
a notifier configured to give a notification that the clutch is in the engagement state or the disengagement state with at least one of sound or light.

11. The electric wheelchair of claim 1, wherein:
the drivable wheel is a first drivable wheel disposed on a left side;
the electric motor is a first electric motor disposed on the left side;
the clutch is a first clutch disposed on the left side;
the clutch operation handle is a first clutch operation handle disposed on the left side; and
the electric wheelchair further comprises:
a second drivable wheel disposed on a right side,
a second electric motor disposed on the right side;
a second clutch disposed on the right side;
a second clutch operation handle disposed on the right side; and
a handle position control mechanism configured to:
(i) by separate operations, position each of the first clutch operation handle and the second clutch operation handle at one of the lowest position of the predetermined range or the highest position of the predetermined range; and
(ii) by one operation, position the first clutch operation handle and the second clutch operation handle positioned at the one of the lowest position of the predetermined range or the highest position of the predetermined range, at the other of the lowest position of the predetermined range or the highest position of the predetermined range.

* * * * *